Sept. 9, 1941.                J. GÜNTHER                 2,255,039
                     CATHODE RAY DEFLECTING DEVICE
                        Filed Nov. 22, 1939
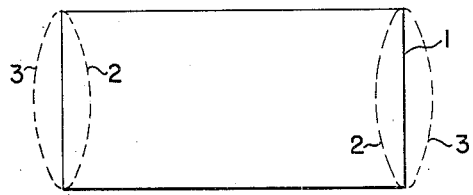
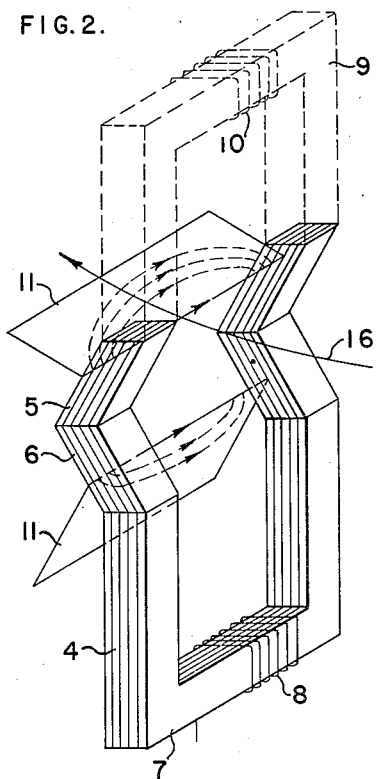
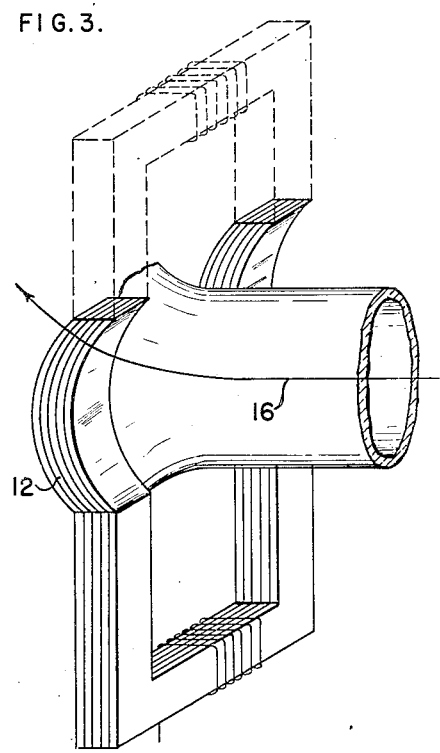
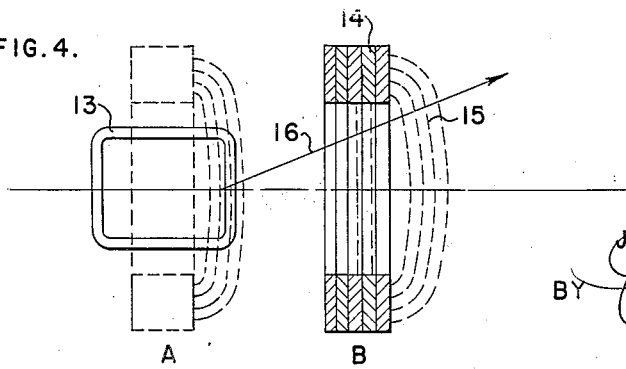
INVENTOR
JOHANNES GÜNTHER
BY
ATTORNEY Patented Sept. 9, 1941

2,255,039

UNITED STATES PATENT OFFICE 2,255,039

CATHODE RAY DEFLECTING DEVICE

Johannes Günther, Berlin-Zehlendorf, Germany, assignor to Fernseh Aktiengesellschaft, Berlin-Zehlendorf, Germany Application November 22, 1939, Serial No. 305,698
In Germany November 23, 1938

1 Claim. (Cl. 250—156)

The invention relates to deflecting devices for cathode ray tubes, particularly those used for television purposes. Such tubes show often a pin-cushion or barrel shaped distortion of the scanning pattern on the screen of the tube so that an undistorted reproduction of images is not possible. These distortions may be caused by the curvature of the screen surface in case the radius of curvature of the screen is larger than the length of the deflected cathode ray. Also screens having a center of curvature lying on the opposite side of the screen from the deflecting system cause similar geometric distortions.

It is known to compensate distortions of this kind by arranging the deflecting means, for instance, electrostatic deflecting plates, geometrically in such a manner that the inhomogeneous field distribution produced by the plates causes a deflection of the cathode ray by which the screen distortions are compensated. Such systems have been proposed particularly for avoiding the keystone effect. These systems however do not allow to compensate pin-cushion or barrel shaped distortions occurring only on two opposite sides of the scanning patterns without simultaneously influencing the two remaining sides of the scanning pattern and without influencing the focussing of the cathode ray bundle because always the field between the plates, i. e., the main deflecting field, has been used for producing the compensating effect.

It is an object of the invention to provide a deflecting device for cathode ray tubes in which the deflecting system is so formed that the planes in which the curved lines of force are situated, particularly those lines of force starting at the front plane of the deflecting system in the direction of the cathode ray, include such an angle with the cathode ray and that the lines of force are curved in such a manner that pin-cushion or barrel shaped distortions are either completely compensated or do not come into existence. The main deflecting field lying for instance between the poles of the deflecting system is not changed and remains homogeneous so that no defocussing of the cathode ray occurs.

It has been found that two components are important for the distortion of the scanning patterns, firstly the angle between the plane in which the lines of force are situated and that of the cathode ray and secondly the curvature of the lines of force. The angle of the plane in which the curved lines of force are situated is dependent upon the form of the deflecting device and can be influenced by suitably forming the deflecting device. If for instance an iron yoke is used for deflecting the cathode ray it can be so constructed that the front planes of the poles or legs are essentially normal to the direction of the cathode ray. In such a case the deflected cathode ray includes a zero angle with the planes in which the lines of force acting upon the ray are situated, so that no distortion is produced, i. e. a distortion caused by the screen will be compensated.

The magnitude of the barrel shaped distortion is influenced by the curvature of the lines of force at the point at which they are met or cut by the cathode ray. It is possible for instance when two deflecting devices are used to deflect the cathode ray by the first deflecting system into regions of the second system in which a stray field of predetermined curvature is present so that the resultant deflection has the desired form.

The invention will now be described in connection with the drawing showing embodiments of the invention.

Fig. 1 shows the outer contour of a scanning pattern.

Figs. 2 and 3 show each a perspective view of a deflecting yoke and

Fig. 4 shows the arrangement of two deflecting systems.

Fig. 1 shows the outer contour 1 of a scanning pattern of rectangular shape. The dotted lines 2 show a pin-cushion shaped distortion while the dotted lines 3 indicate a barrel shaped distortion at two opposite sides of the pattern.

Fig. 2 shows as one form of the invention a deflecting yoke 4 for instance for vertically deflecting the cathode ray. The legs or poles of the yoke are curved or bent to form angular extensions 5, 6 so that the cathode ray 16 in its upwardly deflected position passes through a field which is formed by lines of force starting at the front side of part 5 of the yoke in such a manner that the planes 11 in which the curved lines of force are situated are parallel to the cathode ray. With a yoke of this form a barrel shaped distortion of the two vertical sides of the scanning pattern can be avoided. Such a distortion would occur if a deflecting yoke with straight legs would be used particularly if a strong deflection for large angles is used. The part 7 of the yoke connecting the legs carries a coil 8 through which the saw-tooth current flows and which is connected with a sweep current generator, for instance, of the transformer type.

The invention is however not limited to the embodiment shown in Fig. 2. It is possible to use a closed iron yoke and this is indicated in Fig. 2 by dotted lines. The upper part 9 of the yoke may also carry a coil 10 through which the deflecting current flows.

Another embodiment of the invention is represented in Fig. 3 in which the yoke 12 has curved extensions of convex or partly circular shape. It is also possible to use a yoke with concave extensions if a corresponding angle between the plane of the curved lines of force and the cathode ray 16 is desired.

As mentioned above it has been found that with increasing curvature of the lines of force the barrel or pin-cushion shaped distortions will increase. It can therefore be advantageous to use a predeflection of the cathode ray, for instance, by the line deflecting system of a television tube, in such a manner that the cathode ray passes through regions of the image deflecting field having a strong curvature of the lines of force.

Fig. 4 shows the arrangement of two deflecting systems. The cathode ray is indicated by arrow 16, the first deflecting system 13 consists of rectangular coils while the second deflecting system is indicated by the cross section 14 of arms of a yoke. The distances between the first deflecting system 13 and the yoke 14 may be varied as represented by positions $a$ and $b$. If the yoke is situated at $a$ the cathode ray passes only through the central part of the deflecting field of yoke while in the position $b$ the cathode ray passes through the edges of the stray field where the lines of force have a strong curvature. The distance between the first and second deflecting system is therefore of influence on the magnitude of the distorting or compensating effect.

The invention is described particularly in connection with deflecting systems consisting of iron yokes. It is however not limited to systems of this kind but can be carried out in connection with deflecting coils without iron yoke by forming the transverse leads of the coils in a corresponding manner.

In case of Fig. 4 it is possible to use a first deflecting system containing an iron yoke instead of coils 13 and to combine coils with or without iron in any desired manner.

It is also possible to prevent not only the distortion in vertical direction but also in a horizontal direction by similar measures, namely, by using a suitable angle between the planes of the lines of force effecting the horizontal deflection and the cathode ray, and by choosing the curvature of lines of force correspondingly.

The invention is of particular use for television receiving or transmitting devices. It is not limited to the barrel or pin-cushion shaped distortions shown in Fig. 1 but there may be other forms of distortions of the edges of scanning patterns and it is possible by using the rules given in the invention to arrive at a compensation of the particular distortion. The invention is furthermore applicable in cases in which the distortion does not appear on the screen of the cathode ray tube but on a projection surface so that also optical distortions are compensated.

What I claim is:

In combination with a cathode-ray tube having a screen, a cathode-ray deflecting device including a flux-producing structure, the portion of said structure nearest the axis of said cathode-ray tube in the direction of the main flux lines being convex in a direction facing the screen end of said cathode-ray tube.

JOHANNES GÜNTHER.